US009860308B2

(12) United States Patent
Berajawala et al.

(10) Patent No.: US 9,860,308 B2
(45) Date of Patent: Jan. 2, 2018

(54) COLLABORATIVE CREATION OF ANNOTATION TRAINING DATA

(71) Applicant: International Business Machines Corporation, Armonk, NY (US)

(72) Inventors: Suneil H. Berajawala, Lowell, MA (US); Anthony T. Levas, Yorktown Heights, NY (US); Siddharth A. Patwardhan, Yorktown Heights, NY (US); David D. Taieb, Charlestown, MA (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 14/553,028

(22) Filed: Nov. 25, 2014

(65) Prior Publication Data

US 2016/0147399 A1 May 26, 2016

(51) Int. Cl.
| | | |
|---|---|---|
| G06F 17/00 | (2006.01) | |
| G06F 17/24 | (2006.01) | |
| H04L 29/08 | (2006.01) | |
| G06Q 10/10 | (2012.01) | |

(52) U.S. Cl.
CPC ............ H04L 67/10 (2013.01); G06F 17/241 (2013.01); G06Q 10/101 (2013.01); H04L 67/1095 (2013.01)

(58) Field of Classification Search
CPC ............... G06F 17/241; G06F 17/2288; G06F 17/30684; G06F 17/2211
See application file for complete search history.

(56) References Cited

U.S. PATENT DOCUMENTS 6,564,246 B1    5/2003  Varma et al.
8,554,825 B2   10/2013  Falchuk et al.
8,566,787 B2   10/2013  Maskeri Rama et al.
(Continued)

FOREIGN PATENT DOCUMENTS

WO        2013154502 A1    10/2013

OTHER PUBLICATIONS

Georgios Petasis, The SYNC3 Collaborative Annotation Tool, 2012, "IGI Global", pp. 1-8.*
Chen et al., "ROSeAnn: Reconciling Opinions of Semantic Annotators," Proceedings of the VLDB Endowment, 2013, vol. 6, No. 12.
Heer et al., "Voyagers and Voyeurs: Supporting Asynchronous Collaborative Information Visualization," CHI 2007 Proceedings—Distributed Interaction, Apr. 28-May 3, 2007, p. 1029-1038, ACM, San Jose, California.
(Continued)

*Primary Examiner* — Ariel Mercado Vargas
(74) *Attorney, Agent, or Firm* — Anthony R. Curro

(57) ABSTRACT

Collaborative annotation of a document. A GUI is generated by a host computer that displays a document to annotate. The GUI is transmitted by the host computer to a plurality of client computers. Real time communication modes are established by the host computer between the client computers, each including communication channels between all the client computers. The host computer receives annotations entered into the GUIs at the client computers, each annotation identifying a span of words in the document to annotate and including an associated annotation type. The host computer updates the GUI to include for display the received annotations and inter-rater agreement statistics indicating the level of agreement between annotations received from each client computer and annotations received from the other client computers. The updated GUI is then transmitted by the host computer to the plurality of client computers.

12 Claims, 10 Drawing Sheets

(56) References Cited

U.S. PATENT DOCUMENTS

| | | | |
|---|---|---|---|
| 8,612,469 B2 | 12/2013 | Neff et al. | |
| 2007/0118795 A1* | 5/2007 | Noyes | G06F 17/241 715/203 |
| 2010/0070845 A1* | 3/2010 | Facemire | G06F 17/241 715/230 |
| 2011/0113320 A1* | 5/2011 | Neff | G06Q 10/10 715/230 |
| 2013/0097481 A1* | 4/2013 | Kotler | G06F 17/241 715/230 |
| 2013/0185622 A1 | 7/2013 | Odean et al. | |
| 2013/0246098 A1 | 9/2013 | Habboush et al. | |
| 2013/0262373 A1* | 10/2013 | Rampson | G06F 17/2288 707/608 |
| 2013/0326330 A1* | 12/2013 | Harris | G06F 17/24 715/234 |
| 2014/0108908 A1 | 4/2014 | Neff et al. | |

OTHER PUBLICATIONS

Ma et al., "Models and Tools for Collaborative Annotation," Apr. 3, 2002, Linguistic Data Consortium, University of Pennsylvania, Philadelphia, PA.

Neuwirth et al., "Issues in the Design of Computer Support for Co-authoring and Commenting," CSCW 90 Proceedings, Oct. 1990, p. 183-195, ACM, Carnegie Mellon University, Pittsburgh, PA.

Weng et al., "Asynchronous Collaborative Writing through Annotations," CSCW'04, Nov. 6-10, 2004, ACM, Chicago, Illinois.

Zhou et al., "A Semi-Automatic Evaluation Scheme: Automated Nuggetization for Manual Annotation," Proceedings of NAACL HLT 2007 Companion Volume, Apr. 2007, p. 217-220, Association for Computational Linguistics, Rochester, NY.

* cited by examiner

| ANNR ID | TIME | SPAN(S) | TYPE |
|---|---|---|---|
| MARY | 0900.12 | 122:124 | ChiefComplaint |
| ROBERT | 0901.29 | 123:125<br>133:133 | LocationOf |
| SUSAN | 0914.48 | 166:171 | VitalSign |

Agreement to Other Annotators: 0.75    Agreement to Correct Annotations: 0.67

Annotators
- James
- ■ Mary
- ◆ Peter
- ■ Robert
- ◆ Susan

Document: Lorem Ipsum

Lorem ipsum dolor sit amet loud sneezing consectetur adipiscing elit. Nulla auctor libero non hendrerit placerat. Sed vestibulum, dolor fermentum auctor egestas, ipsum erat ullamcorper augue, sollicitudin lobortis tortor leo id quam. Cras eleifend dolor dui, et blandit ex facilisis ac. Maecenas egestas enim quis dignissim ullamcorper. Morbi imperdiet sollicitudin velit, eget ...  at. Donec rhoncus ligula venenatis lectus ... tur sagittis arcu sit amet arcu feugiat aliquam ... ue,

| Type |
|---|
| Chief Complaint |
| Diagnosis |
| Vital Sign |
| Severity |
| Allergy |
| Medication |

Aenean id elit eu lacus volutpat imper... itur vehicula libero ac, auctor nulla. Proin eu... llus semper. In vel sem ut nunc facilisis at ... buis placerat massa erat, eu semper felis posuere et. Morbi nec purus imperdiet libero accumsan elementum et id nulla.

Fusce fringilla aliquet eros, vel dictum elit mollis et. Donec cursus fringilla semper. Maecenas elementum molestie dui id placerat. Nullam justo enim, pretium nec posuere et, porttitor et urna. Curabitur iaculis eleifend arcu eu tincidunt. Duis in faucibus ipsum. Donec commodo eros urna, id lacinia purus facilisis sit amet. Praesent eros neque, pulvinar a facilisis in, suscipit id felis. Pellentesque facilisis dapibus tortor, eget eleifend dolor convallis vel. Phasellus nec dapibus nulla. Nunc facilisis, quam eu tempus vulputate, sem dolor hendrerit diam, vel rutrum metus elit condimentum orci. Vestibulum scelerisque, justo eu efficitur pretium, nisi nisl cursus ex, in malesuada nibh erat sit amet tortor.

Annotations

Mary 0900.12 09/28/2014
loud sneezing
Symptom

Robert 0901.29 09/28/2014
sneezing
Symptom

Video

Audio

Mary: Nunc facilisis, quam eu tempus.
Susan: Duis placerat massa erat.
Robert: Nullam justo enim, pretium nec posuere
Nullam justo enim, pretium nec posuere

COLLABORATIVE CREATION OF ANNOTATION TRAINING DATA

BACKGROUND

The present invention relates generally to the field of data processing and the presentation processing of documents, and more particularly to a graphical user interface that supports synchronous collaborative work between multiple users.

SUMMARY

Embodiments of the present invention disclose a method, computer program product, and system for collaborative annotation of a document. A graphical user interface (GUI) is generated by a host computer that displays a document to annotate. The GUI is transmitted by the host computer to a plurality of client computers. A plurality of real time communication modes are established by the host computer between the client computers, each communication mode including communication channels between all the client computers. The host computer receives from the plurality of client computers a plurality of annotations entered into the GUIs at the client computers, each annotation identifying a span of words in the document to annotate and including an associated annotation type. The host computer updates the GUI to include for display the received plurality of annotations and inter-rater agreement statistics indicating the level of agreement between annotations received from each client computer and annotations received from the other client computers. The updated GUI is then transmitted by the host computer to the plurality of client computers.

In another aspect of the invention, conflicts between the received annotations are identified by the host computer. A conflict is one or more of an annotation with a span that partially overlaps the span of another annotation, an annotation with a span that partially or wholly overlaps the span of another annotation and the associated type of one of the annotations does not match the associated type of the other annotation, and a span of words associated with fewer annotations than the number of the plurality of client computers. Updating, by the host computer, the GUI further includes including for display the identified conflicts between the received annotations.

BRIEF DESCRIPTION OF THE SEVERAL VIEWS OF THE DRAWINGS

FIG. 4 is an illustration of the record layout of the annotation datastore of FIG. 2, in accordance with an embodiment of the present invention.

FIGS. 5A and 5B illustrate a graphical user interface for collaborative annotation, in accordance with an embodiment of the present invention.

DETAILED DESCRIPTION

Figure 1:
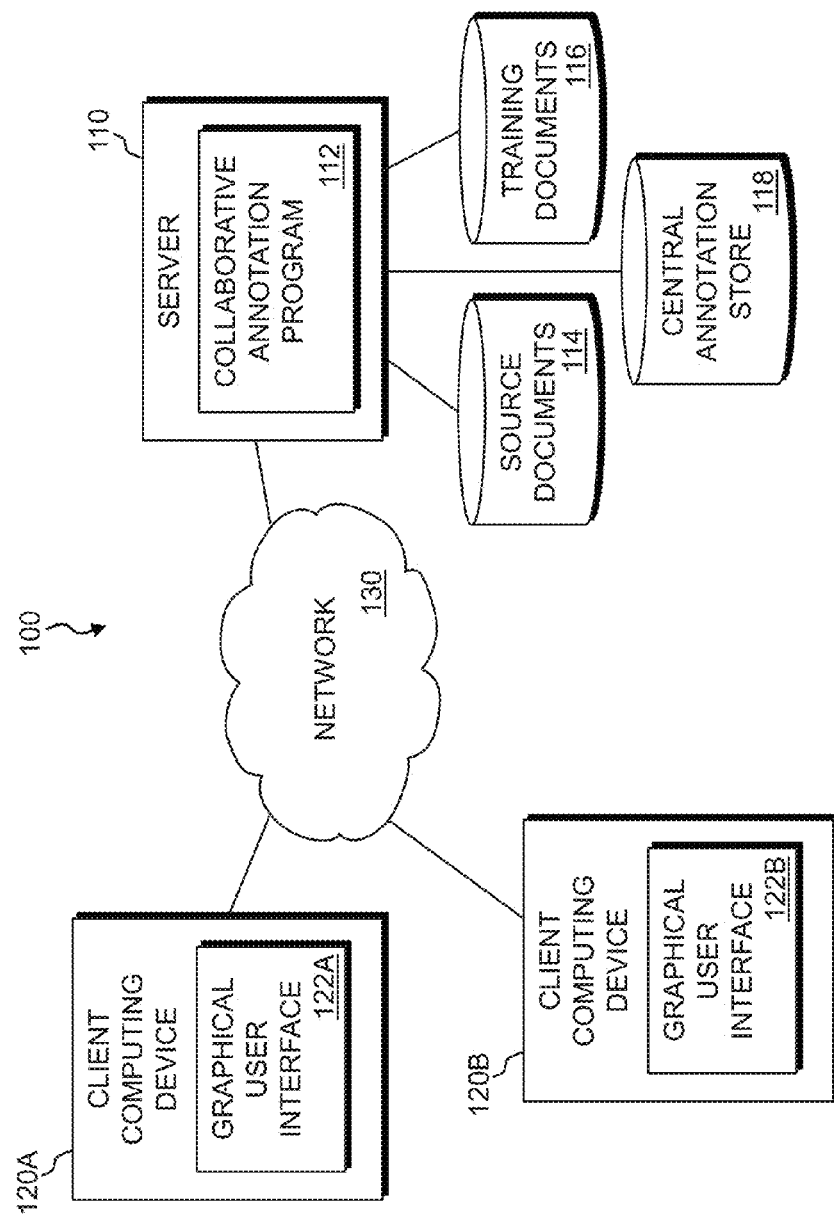
FIG. 1 is a functional block diagram of a collaborative document annotation system, in accordance with an embodiment of the present invention.

Correctly annotated documents may form the basis for training data for natural language processing (NLP) based automated annotation systems. Correctly annotated documents may also be used as training tools to train human annotators. Various embodiments of the invention are directed to collaboratively producing correctly annotated documents in real time, or synchronously. Annotators may collaboratively annotate a document via, for example, a graphical user interface (GUIs) at each annotator's computing device. The synchronous collaborative annotation sessions are managed by a session manager application on a network server. The session manager receives annotations from each annotator and can display all received annotations on each annotator's GUI. As annotations are received, the session manager may compute various inter-rater agreement scores, for example, Kappa scores, indicating, for example, the level of agreement among all annotators for a given annotation, or the level of agreement of a specific annotator to all other annotators for one or more annotations.

To assist the annotators, in arriving at a consensus for an annotation, or, for example, arriving at an inter-rater agreement score above a threshold value, the GUIs include one or more real time communication channels between the annotators managed by the session manager. The communication channels may include, for example, a real time group chat session, a real time video conference, a real time group audio channel, etc. The real time communication occurring over the communication channels may be stored, and include timing marks that associate portions of the communications to an annotation being discussed. The annotators may iteratively annotate a phrase until a desired level of agreement is reached. A history of how each annotation progressed to a correct annotation may be stored to assist in identifying persistent annotation issues, in calculating inter-rater agreement scores, and in training human annotators to correctly annotate documents.

An annotation coordinator may act as the final arbiter in resolving conflicting annotations and determining the "correct" annotation. In certain embodiments, NLP based tools may assist the annotation coordinator in determining a correct annotation by, for example, analyzing a corpus of previously annotated documents and providing ranked recommendations for resolving specific annotation conflicts.

In various embodiments, a guideline outline may be automatically generated that includes, for example, a summarization by type of each annotation in the document. A summary by type may include, for example, each correct annotation and the associated incorrect annotations, and links to any associated real time discussions that may have occurred over the multimodal communication interfaces. The guideline outline may form the basis of a training guideline document for the specific type of document being annotated. For example, based on an automatically generated guideline outline, a training guideline document may include correct examples for each type of annotation expected to be encountered in a source document. The training guideline document may also include examples of frequently occurring incorrect annotations associated with each annotation type, and links to relevant real time discussion that may have occurred during creation of the correctly annotated document.

In certain embodiments of the invention, human annotators may be trained to annotate documents based on a corpus of correctly annotated documents. The session manager, operating in a single user training mode, may manage, for example, a GUI at an annotator's computing device that displays the unannotated text from a previously correctly annotated document. As the annotator annotates the text, various statistics, for example, inter-rater agreement scores, and other information may be displayed to the annotator to assist in the training.

In embodiments of the invention, an annotation may be a comment associated with text, image, or other objects in a document, collectively referred to herein as text. The comments may be limited to certain recommended or allowed comments. Annotation involves selecting one or more spans of words or characters, or phrases, in a document, and entering a comment to associate with the phrase or phrases. A phrase may be a single word, multiple words, multiple characters, a sentence, or multiple sentences. A phrase may also include images and other objects in a document. In an exemplary embodiment described in more detail below, medical case notes are annotated with a specific set of "entity types," for example, "Chief Complaint," "Vital Sign," etc. Two or more phrases may be linked by a "relation" annotation, for example, "Cause Of," "Location Of," etc. The span of one annotated phrase may wholly or partially overlap the span of another annotated phrase.

FIG. 1 is a functional block diagram of collaborative document annotation system 100, in accordance with an embodiment of the present invention. Collaborative document annotation system 100 includes network server 110 and client computing devices 120, all interconnected over a network 130.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server 110 and client devices 120, in accordance with embodiments of the invention.

In various embodiments of the invention, a client computing device 120 may be, for example, a laptop computer, tablet computer, netbook computer, personal computer (PC), a desktop computer, a personal digital assistant (PDA), or a smart phone. In general, a client computing device 120 may be any programmable electronic device capable of communicating with server 110 via network 130, and of supporting functionality as requited by one or more embodiments of the invention. A client computing device 120 may include internal and external hardware components as depicted and described in further detail below with reference to FIG. 9. As described in more detail below, each client computing device 120 includes a graphical user interface 122.

Server computer 110 may be a laptop computer, netbook computer, personal computer (PC), a desktop computer, or any programmable electronic device capable of hosting collaborative annotation program 112, described below, and communicating with client devices 120 via network 130, in accordance with embodiments of the invention. Server computer 110 may include internal and external hardware components, as depicted and described in further detail below with reference to FIG. 9.

In an embodiment of the invention, server computer 110 includes collaborative annotation program 112, source documents 114, training documents 116, and central annotation store 118.

Figure 9:
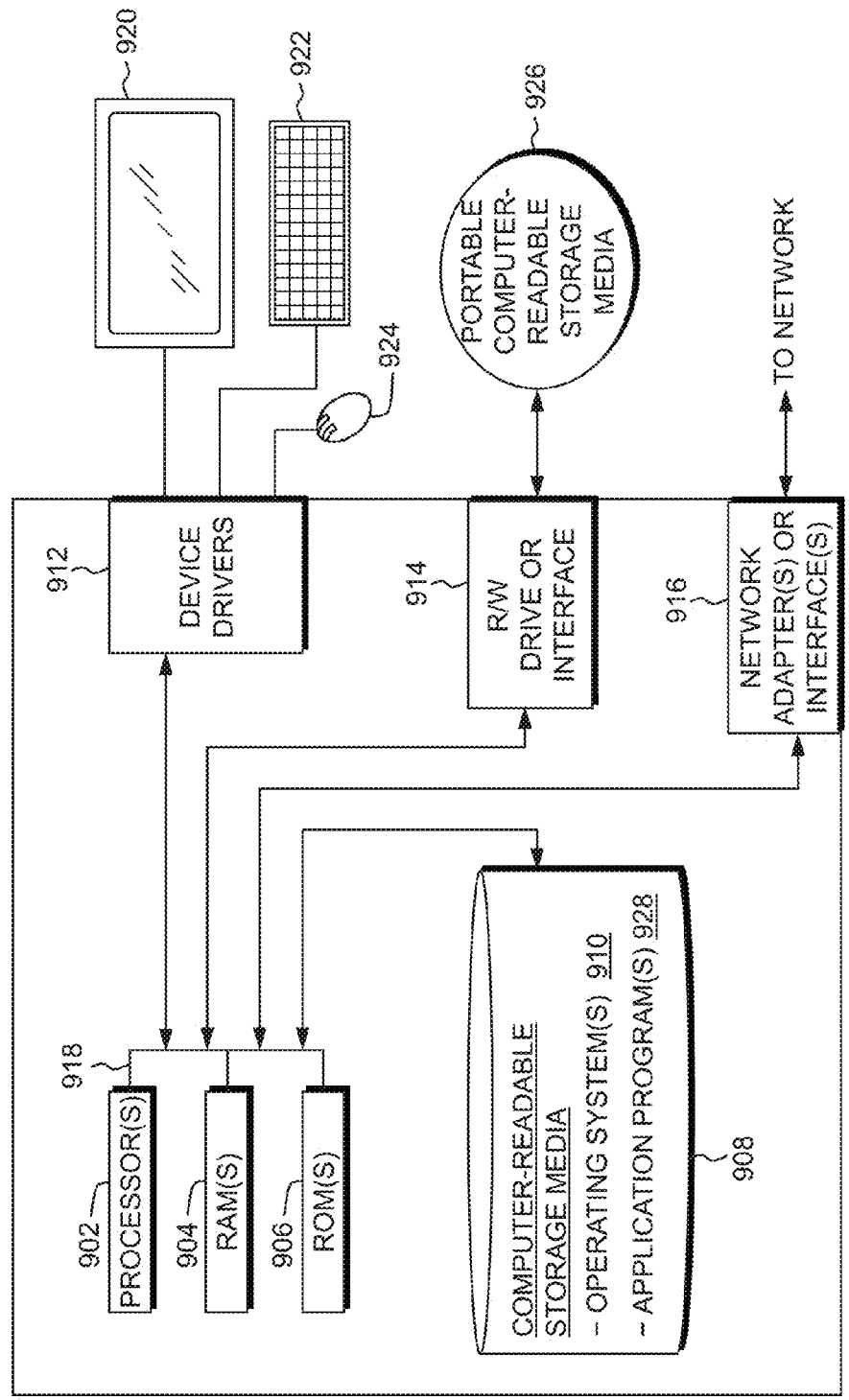
FIG. 9 is a functional block diagram of components of a client computing device and/or a server device of the collaborative document annotation system of FIG. 1, in accordance with an embodiment of the present invention.

Source documents 114 represents a store of documents that may be annotated. Source documents 114 may reside, for example, on computer readable storage media 908 (FIG. 9). These documents may include, for example, word processing documents, such as documents generated by Microsoft Word®, OpenOffice® Writer®, or other proprietary or open source word processing systems. The documents may also include records, or fields within records, created by special purpose application systems. For example, in an exemplary embodiment, a document may be one or more medical case note entries in an electronic health record (EHR) or electronic medical record (EMR) created by medical professional during a patient examination using a proprietary or open source EHR/EMR system. One of skill in the art will recognize that the principles of the invention apply to annotating any type of source document, such as a video, a picture, a file written in HTML, or other formats such as text, XML, or PDF.

Training documents 116 represents a store of correctly annotated source documents 114. Training documents 116 may be used, for example, to train NLP based automated annotation systems, and to assist in training human annotators. Central annotation store 118 represents a store of all annotations received by collaborative annotation program 112 from annotators via client computing devices 120. These annotations may be used, for example, to assist annotators, to train NLP based automated annotation systems, and to assist in training human annotators.

Collaborative annotation program 112 operates generally to host a collaborative annotation session between multiple client computing devices 120 to enable multiple annotators to collaboratively annotate a source document 114 in real time. As described in more detail below, collaborative annotation program 112 may receive an initial request, for example, from a client computing device 120, to open a source document 114 in source documents 114 for annotation. Collaborative annotation program 112 initiates a collaborative annotation session by, for example, establishing the necessary datastores in the memory of server 110 to manage the collaborative annotation session, and transmitting a GUI 122 to the initiating client computing device 120 to allow annotation of the document. As additional client computing devices 120 join the collaborative annotation session, they also receive a GUI 122. In an exemplary embodiment, collaborative annotation program 112 establishes multimodal communications between client computing devices 120 via the GUIs 122 to allow annotators to communicate and collaborate during the collaborative annotation session. The multimodal communications may include, for example, a real time group chat session, a real time video conference, etc.

Figure 2:
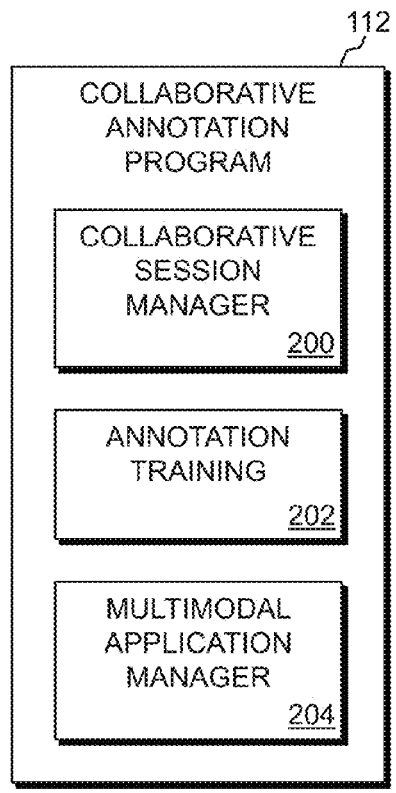
FIG. 2 is a functional block diagram of the collaborative annotation program of FIG. 1, in accordance with an embodiment of the present invention.

FIG. 2 is a functional block diagram of collaborative annotation program 112, in accordance with an embodiment of the invention. Collaborative annotation program 112 may include collaborative session manager 200, annotation training module 202, and multimodal application manager 204.

Collaborative session manager 200 operates generally to manage the GUIs 122 on client computing devices 120, to track and store annotations of a document 114 received via the GUIs 122, and, when annotation of a document is complete, to write out the annotated document as a correctly annotated training document 116. In an exemplary embodiment, all annotations received by collaborative session manager 200 for all annotated documents are stored in central annotation store 118.

Figure 3:
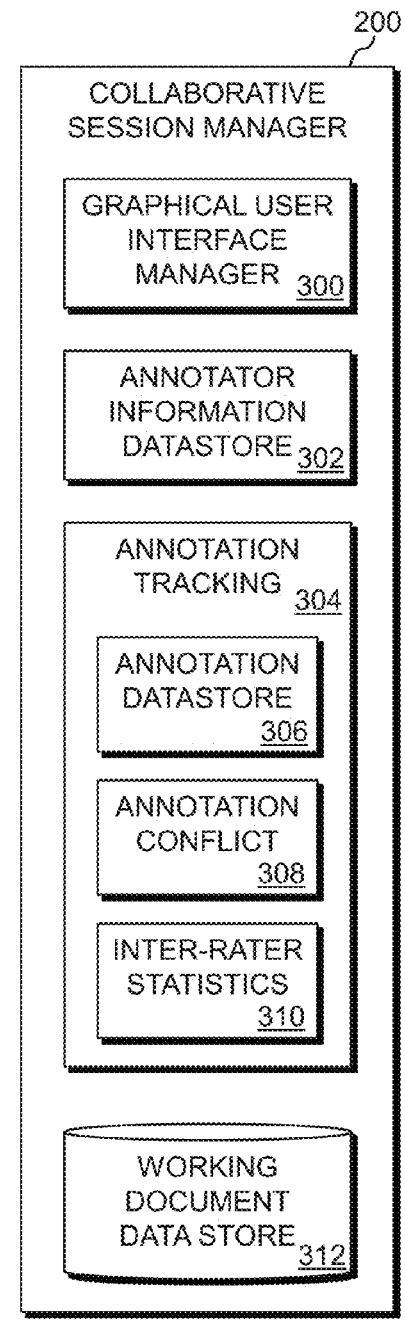
FIG. 3 is a functional block diagram of the collaborative session manager module of FIG. 2, in accordance with an embodiment of the present invention.

FIG. 3 is a functional block diagram of collaborative session manager 200, in accordance with an embodiment of the invention. Collaborative session manager 200 may include GUI manager 300, annotator information datastore 302, annotation tracking module 304, and working document datastore 312. Annotation tracking module further includes annotation datastore 306, annotation conflict module 308, and inter-rater statistics module 310.

In an exemplary embodiment, GUI manager 300 operates to manage the GUIs 122 on computing devices 120. When a collaborative annotation session is initially invoked, for example, by entering a universal resource locator (URL) into a web browser on a client computing device 120, server 110 receives the request, for example, over network 130, and directs it to collaborative annotation program 112. Within collaborative annotation program 112, the request is passed to GUI manager 300 of collaborative session manager 200 to initialize the session.

GUI manager 300 may send an initial login web page to a GUI 122, for example, a web browser, on the requesting client computing device 120 to request, for example, an annotator ID and a source document to annotate. When the requestor enters and transmits an annotator ID and source document name back to GUI manager 300, the GUI manager may initialize and/or populate annotator information datastore 302, described just below, with information identifying the collaborative annotation session requestor, and may identify the requestor as the collaborative annotation session coordinator. As additional annotators join the collaborative annotation session, information for each annotator is entered into annotator information datastore 302.

Annotator information datastore 302 represents a datastore, for example allocated storage on computer readable storage media 908, to record information associated with each annotator who joins a collaborative annotation session. This information may include, for example, an annotator ID for each annotator, the network address of the client computing device 120 associated with an annotator ID, a color or other distinguishing characteristics associated with annotations received from an annotator, an indicator indicating whether an annotator is acting as the collaborative annotation session coordinator, etc.

GUI manager 300 may then retrieve the document to annotate from source documents 114, and load the document into working document datastore 312. Working document datastore 312 represents a datastore, for example allocated storage on computer readable storage media 908, that is used as working storage for a source document 114 while the document is being annotated. In an embodiment, metadata is added to the retrieved document that associates a number with each "word" in the document. For example, a word may be defined as one or more contiguous alphanumeric characters delimited by one or more spaces (or other characters, such as a dash), and each word in the document, beginning with the first, may be consecutively numbered. A word may also include other objects in the document, such as images. In other embodiments, each character, or other groupings of characters, such as syllables, may be numbered. As described in more detail below, this metadata provides a mechanism to identify the span of an annotation.

GUI manager 300 may then transmit to the requesting client computing device 120 a collaborative annotation web page, such as collaborative annotation web page 500 (FIG. 5), described in more detail below. In various embodiments, the collaborative annotation web page provides a way for annotators to enter and submit annotations of the document to collaborative session manager 200, and to display annotations submitted by each annotator to all annotators. For example, the collaborative annotation web page may include a version of the source document from working document store 312, including the word and/or character numbering metadata, embedded in the web page, and Java scripts that facilitate user annotation of the embedded document and transmittal of the annotations to GUI manager 300.

The collaborative annotation web page may also provide a platform to embed one or more multimodal communication interfaces, such as multimodal communication interfaces 508, described in more detail below, to allow communications between the computing devices 120 that are collaboratively annotating the source document 114. In an embodiment, when two or more client computing devices 120 have joined a collaborative annotation session hosted by collaborative session manager 200, multimodal application manager 204 (FIG. 2) may, at the request of the collaborative session manager, establish one or more multimodal communication sessions between the client computing devices. For example, multimodal application manager 204 may establish one or more server based communications interfaces, such as an instant messaging application, a video chat application, a voice application, etc. These communication applications may include any suitable proprietary or open source server based communications interfaces, in accordance with an embodiment of the invention. In an embodiment, multimodal application manager 204 may establish one or more server based communications interfaces between all annotators based on the network addresses associated with the annotators stored in annotator information datastore 302. These interfaces may be embedded in the collaborative annotation web pages managed by GUI manager 300.

In certain embodiments, the real time communications occurring over the multimodal communication interfaces are stored in a datastore. The stored communications may include, for example, timing marks, entered, for example, by the collaborative session coordinator, to associate portions of the communications with the annotations that are being discussed. Links to these timing marks may be included in the metadata written to the working document in working document datastore 312 to link annotations to real time discussions that may have occurred over one or more of the multimodal communication interfaces.

Returning to FIG. 3, after GUI manager 300 has transmitted collaborative annotation web pages to all client computing devices 120 that have joined the collaborative annotation session, and multimodal communication interfaces have been established by multimodal application manager 204 between all the client computing devices, annotators may begin to annotate the selected source document 114 embedded in the collaborative annotation web pages. As each annotation is received by GUI manager 300 via, for example, the GUI interfaces 122, the annotations are recorded by annotation tracking module 304 in annotation datastore 306.

In certain embodiments, client computing device interaction with server 110 is conducted through a collaborative annotation client application that resides on each client computing device 120. In these embodiments, for example, GUI manager 300 of collaborative session manager 200 may perform certain centralized functions, and the resident client application may provide the annotator interface. For example, each resident client application may request and receive a copy of the desired source document 114 and prepare the source document for annotation, by, for example, embedding metadata that identifies the position of each character in the source document. As each annotator annotates their copy of the source document 114, via their resident client application, the annotations are transmitted to GUI manager 300. GUI manager 300 may record all received annotations in annotation datastore 306 and central annotation datastore 118, and transmit each annotation received to all executing resident client applications on client computing devices 120, which then may update their local copies of the source document 114. GUI manager 300 may also identify annotation conflicts and calculate inter-rater agreement statistics, which may then be transmitted to the resident client applications for display to the annotators.

FIG. 4 illustrates a field layout for entries in annotation datastore 306, in accordance with an embodiment of the invention. The fields may include annotator ID (ANNR ID), an annotation timestamp (TIME), the annotation span(s) (SPAN(S)), and the type of the annotation (TYPE). Those of skill in the art will recognize that annotation datastore 306 may include many additional and/or different fields, depending on the design of various implementations. In this example, annotator ID may be the annotator login ID from annotator information datastore 302. The annotation timestamp represents any internal representation of a time or date/time, in accordance with an embodiment of the invention. Annotation span(s) may be defined as, for example, the starting word or character of the annotation and the ending word or character of the annotation, as illustrated, or any other suitable span format. An annotation may include, or require, more than one annotation span. For example, as illustrated, the second annotation, received from annotator ID "Robert," has the type "LocationOf," which is a relation type annotation. In the exemplary embodiment, relation type annotations link two or more annotation spans. For example, a LocationOf relation type annotation may link an anatomic site to a finding, such as "right lung," an anatomic site, located in the source document beginning at word location 123 and extending to word 125, is the location of "pneumonia," a finding, located in the source document beginning and ending at word location 133.

Returning to FIG. 3, as annotations are received from client computing devices 120 that have joined the collaborative annotation session, GUI manager 300 may update the collaborative annotation web page to include all received annotations, and transmit the updated page to all client computing devices 120. As described in more detail below, annotations embedded in the web page may, for example, include metadata identifying the annotator, and may, for example, include color formatting information so that annotations from each annotator are displayed in a characteristic color. Embedded Java scripts may, for example, cause the display of information related to an annotation, such as how all annotators annotated a particular span, when the cursor is positioned over a span of annotated text in an annotated source document 114.

When annotations are received from multiple annotators, annotation conflicts may be identified by annotation conflict module 308. Annotation conflicts result when annotations from all annotators do not match. For example, the span of one annotation may partially, but not exactly, overlap the span of another annotation, or the annotation type of overlapping annotations may differ. Another type of conflict is where an annotation has not been identified by all annotators.

For example, collaborative session manager 200 receives a request from client computing device 120A, to annotate the phrase "loud sneezing" with the type "ChiefComplaint" in a source document 114 that is being collaboratively annotated. Annotation tracking module 304 then adds a record to annotation datastore 306 recording the location, span, and type of the annotation. A second annotation request is received and recorded from client computing device 120B to annotate the phrase "sneezing" with the type "ChiefComplaint." These two annotations conflict because, although the annotation type matches, the span is different.

If all annotators agree, then annotation datastore 306 will include groupings of annotations having identical spans and types, and each grouping will include one annotation per annotator. Conflicts between annotations exist when an annotation has a span that partially overlaps the span of another annotation, an annotation has a span that partially or wholly overlaps the span of another annotation and the associated type of one of the annotations does not match the associated type of the other annotation, or a span of words is associated with fewer annotations than the number of the client computers.

Annotation conflict module 308 may identify annotation conflicts by, for example, sorting the entries in annotation datastore 306 by span. Conflicting annotations may be identified in the sorted entries as entries that only partially overlap adjacent sorted entries, adjacent sorted entries that exactly overlap but have different types, and groupings of matching entries (or single-entry groups) that do not include entries from all annotators who were or are members of the collaborative annotation session. Similarly, for relation type annotations, conflicts may be identified for each span and associated type of the relation, and for the relation type of the annotation. In an embodiment, GUI manager 300 may embed metadata in the collaborative annotation web page that may identify conflicting annotations with a particular display characteristic, such as color, font, formatting, etc.

In an exemplary embodiment, inter-rater statistics module 310 may analyze the annotation entries in annotation datastore 306 to produce statistical measures indicating a level of agreement among annotators with respect to their annotations. For example, statistics may be produced showing the level of overall agreement between all annotators for all annotations in a source document, the level of agreement of each annotator to all other annotators, the level of agreement between each annotator and the correct annotations in a source documents, etc. In certain embodiments, all annotations for all collaboratively annotated documents are recorded in central annotation store 118. For these embodiments, inter-rater statistics module 310 may produce statistics that take into account these historical entries. For example, a certain phrase that is annotated in the current source document 114 may have appeared in, and been annotated in, other source documents. Inter-rater statistics module 310 may include these historical annotations in certain inter-rater agreement calculations. Such statistics may be displayed on the collaborative annotation web pages to assist annotators in better arriving at consensus annotations.

In various embodiments, inter-rater statistics module 310 may use any suitable statistical calculation to produce inter-rater agreement scores, as may be known to those skilled in the art. Typically, inter-rater agreement scores are calculated by determining the degree of agreement in classification over that which would be expected by chance. For example, the level of agreement between all annotators may be calculated using Fleiss' kappa, which is a statistical measure for assessing the reliability of agreement between a fixed number of raters when assigning categorical ratings to a number of items or classifying items. The level of agreement between an annotator and the correct annotations may be calculated using, for example, Cohen's kappa or Scott's pi statistic. Those of skill in the art will recognize that other statistical measures may be used to determine inter-rater agreement. More sophisticated approaches may also be used, such as using weighted kappa measures to indicate that certain disagreements between types may be given more weight.

Returning to FIG. 2, after all annotations have been agreed upon, for example, by having the annotator designated as the collaborative annotation session coordinator indicate all correct annotations, collaborative session manager 200 may produce a correctly annotated version of the source document 114 and write the document to training documents 116. A correctly annotated version may be produced, for example, by extracting a correctly annotated version from working document datastore 312, and writing the document to training documents 116 in the desired document format or formats. One format of the training document 116 may include, for example, metadata that includes the annotation history of the document that may be used for annotator training purposes.

Returning to FIG. 1, a client computing device 120 includes a GUI 122. In an exemplary embodiment, a GUI 122 is a collaborative annotation web page transmitted from GUI manager 300 of collaborative session manager 200, and displayed in a web browser executing on the client computing device 120 that allows an annotator to interact with collaborative annotation program 112 on server 110.

Figure 5B:
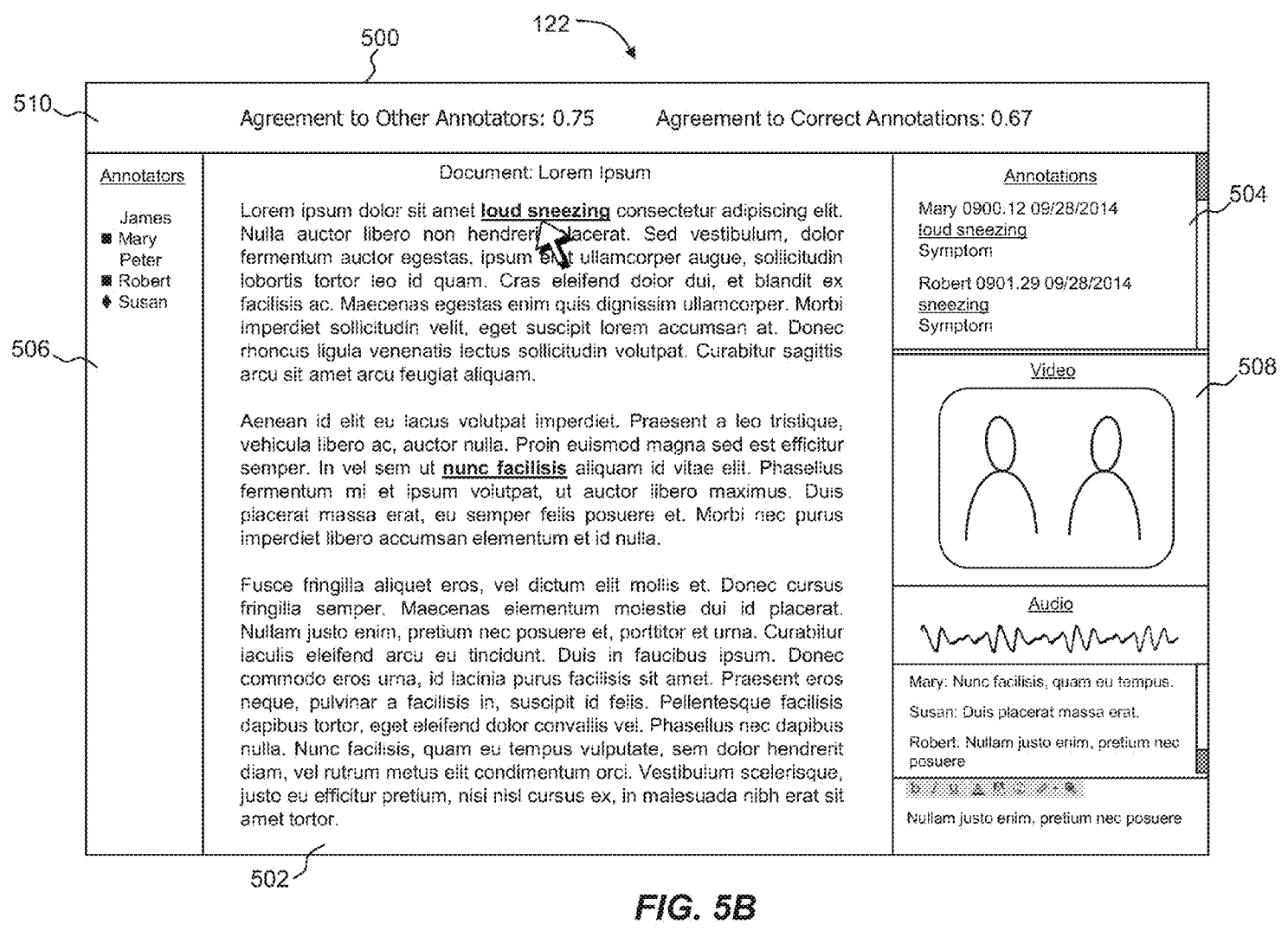

FIGS. 5A and 5B illustrate a GUI 122, in accordance with an embodiment of the invention. As mentioned above, in an exemplary embodiment, GUI 122 is a collaborative annotation web page 500 displayed in a web browser executing on a client computing device 120. Collaborative annotation web page 500 includes a document pane 502, an annotations pane 504, an annotator listing pane 506, a multimodal communications pane 508, and an inter-rater agreement statistics pane 510. HTML code and embedded Java scripts may control how information is presented on the web page, and control interactions of the annotator with this information.

Document pane 502 contains the source document 114 that is being annotated. In an exemplary embodiment, document pane 502 includes all annotations from all annotators. For example, when an annotator annotates a phrase within the document pane 502 of the GUI 122 displayed on the client computing device 120 of the annotator, information defining the annotation, such as annotator ID, annotation location and span, annotation type, etc., is transmitted to collaboration session manager 200. The annotation information may be passed to annotation tracking module 304, where it may be stored in annotation datastore 306, any conflicts with other annotations may be identified by annotation conflict module 308, and inter-rater statistics may be updated by inter-rater statistics module 310. Annotation information may then be passed to GUI manager 300, which may incorporate the just-received annotation, as well as any changed annotation conflict and inter-rater statistics information, into working document datastore 312. GUI manager 300 may then generate an updated collaborative annotation web page 500 and transmit the new collaborative annotation web page to all GUIs 122 so that the just-received annotation will be displayed on all GUIs 122. In various embodiments, GUI manager 300 may create "personalized" collaborative annotation web pages 500, for example, with respect to inter-rater statistics, and transmit a personalized collaborative annotation web page to each GUI 122 that is specific to the annotator using the client computing device 120.

FIG. 5A illustrates an embodiment of how a phrase may be annotated. As shown, the phrase "Maecenas egestas enim," located within the text displayed in document pane 502, has been selected, for example, by left-clicking a mouse or other pointing device and highlighting the desired span of text by dragging a "select" mouse pointer over the desired phrase. In FIG. 5A, the selected text is indicated as shaded. The annotator may then right-click the mouse to display a context drop-down menu that displays selectable "type" entries. When the annotator selects a type, this information may then be transmitted to collaborative session manager 200.

FIG. 5B illustrates an embodiment of how annotation information from all annotators may be displayed. As shown, the phrase "loud sneezing," located within the text displayed in document pane 502 is bolded and underlined, indicating that the phrase has been annotated by one or more annotators. Locating the mouse cursor over the phrase results in a display in annotations pane 504 of information that may include how annotators have annotated the phrase.

Annotator listing pane 506 may display a listing of all annotators that contributed annotations to the current annotated source document 114, including an indication of whether the annotator is available in one or more collaborative session real time multimodal communication interfaces. Multimodal communications pane 508 may include one or more real time communication interfaces, established and controlled by multimodal application manager 204, as described above. For example, in the embodiments illustrated in FIGS. 5A and 5B, real time communication interfaces that have been established for the collaborative annotation session includes a streaming video interface, a streaming audio interface, and an instant messaging, or chat, interface. The multimodal communications pane 508 associated with the collaborative session coordinator may also include the ability to enter timing marks to associate portions of a real time discussion to an annotation being discussed.

Inter-rater agreement statistics pane 510 includes statistics generated by inter-rater statistics module 310. In the illustrated embodiment inter-rater agreement statistics pane 510 includes the level of agreement of the annotator using this collaborative annotation web page 500 to all other annotators, and the level of agreement between this annotator and the correct annotations in the annotated source document 114.

Figure 6:
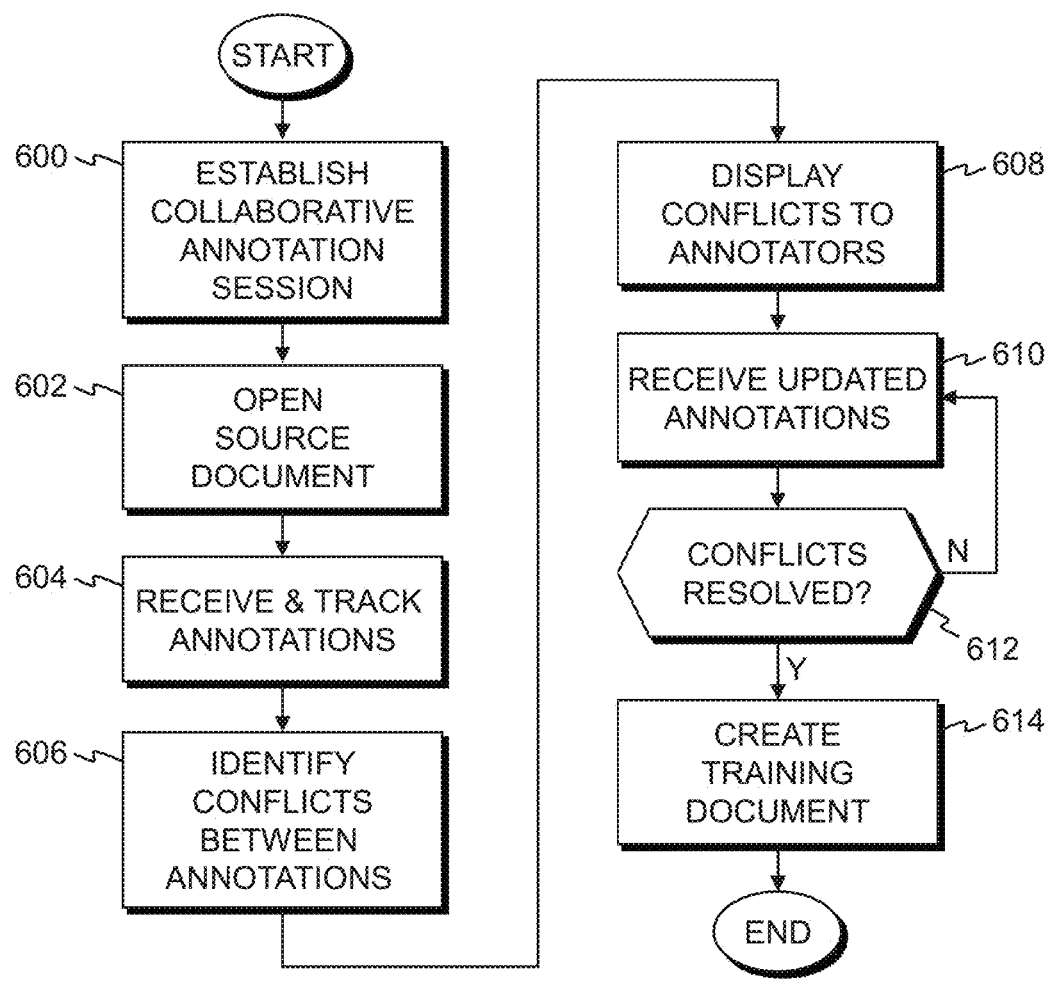
FIG. 6 is a flowchart depicting operational steps of the collaborative session manager module of FIG. 2, in accordance with an embodiment of the present invention.

FIG. 6 is a flowchart depicting operational steps of collaborative annotation program 112 of FIG. 1, in accordance with an embodiment of the invention. When collaborative annotation program 112 receives a request to establish a collaborative annotation session, for example, by receiving a request as the result of an annotator entering the URL of collaborative annotation program 112 on network server 110 into a web browser residing on a client computing device 120, the collaborative annotation program establishes a collaborative annotation session (step 600). In establishing the collaborative annotation session, collaborative annotation program 112 may respond to the request by transmitting a web page to the browser on the requesting client computing device 120 that requests the name of the document that will be annotated.

When the name of the document that will be annotated is received by collaborative annotation program 112, the document may be retrieved from source documents 114 and loaded into working document store 312 (step 602). Metadata may be embedded in the document to, for example, number each word. The formatted document, included embedded metadata, may be embedded in a collaborative annotation web page, along with, for example, Java scripts that enable an annotator to annotate the document, and transmitted to the requesting client computing device 120 for display in, for example, a web browser. Additional display elements are also embedded in the collaborative annotation web page, such as multimodal communication interfaces allowing for real time communication and interaction among all annotators active in the collaborative annotation session, and statistics, indicating agreement among the annotators with respect to their annotations.

When all annotators have joined the collaborative annotation session, GUI manager 300 may receive and track annotations received from client computing devices 120, via, for example, GUIs 122 (step 604). Annotation tracking module 304 tracks the received annotations in annotation datastore 306, and updates the source document in working document datastore 312. GUI manager 300 may then update the collaborative annotation web page 500 with the changes to working document datastore 312 and transmit a new version of the web page to all client computing devices 120 so that all each annotator may display annotations from all other annotators.

Conflicts between annotations are identified by annotation conflict module 308 (step 606), for example, as described above. The annotation conflict information may be embedded in the source document metadata in working document datastore 312 so that it may be displayed to all annotators via each GUI 122 (step 608). Discussions between annotators may occur via one or more of the multi-modal communication interfaces 508 embedded in the collaborative annotation web page 500 to resolve annotation conflicts, and updated annotations may be received by collaborative session manager 200 (steps 610; step 612, "N" branch). The real time communications occurring over the multi-modal communication interfaces 508 may be stored in a datastore. The collaborative annotation session coordinator may have the ability to add timing marks to the saved communications to associate portions of the real time discussion to annotations being discussed. Links to these timing marks may be included in the embedded metadata associated with the annotations.

In various embodiments, all annotations are recorded in central annotation store 118. When, for example, the collaborative session coordinator has resolved all annotation conflicts by defining "correct" annotations (step 612, "Y" branch), collaborative session manager 200 may write the correctly annotated source document 114 in working document datastore 312 to training documents 116 (step 614). In certain embodiments, collaborative session manager 200 may also automatically create a guideline outline from the annotated document and metadata written to working document store 312 that includes, for example, a summarization by type of each annotation in the document. A summary by type may include, for example, each correct annotation and the associated incorrect annotations, and links to any associated real time discussions that may have occurred over the multimodal communication interfaces. The guideline outline may form the basis of a training guideline document for the specific type of document being annotated. For example, based on an automatically generated guideline outline, a training guideline document may include correct examples for each type of annotation expected to be encountered in a source document. The training guideline document may also include examples of frequently occurring incorrect annotations associated with each annotation type, and links to relevant real time discussion that may have occurred during creation of the correctly annotated document.

As mentioned above, in certain embodiments of the invention, human annotators may be trained to annotate documents based on a corpus of correctly annotated documents, for example, training documents 116. Returning to FIG. 2, collaborative annotation program 112, operating in a single user training mode, may manage a GUI 122 at an annotator's client computing device 120, via annotation training module 202, that may display the unannotated text from a previously correctly annotated document from training documents 116. As the annotator annotates the text, various statistics, for example, inter-rater agreement scores, and other information may be displayed to the annotator to assist in the training. In these embodiments, annotation training module 202 may make use of certain functionalities of the various modules of collaborative session manager 200, described above.

Figure 7A:
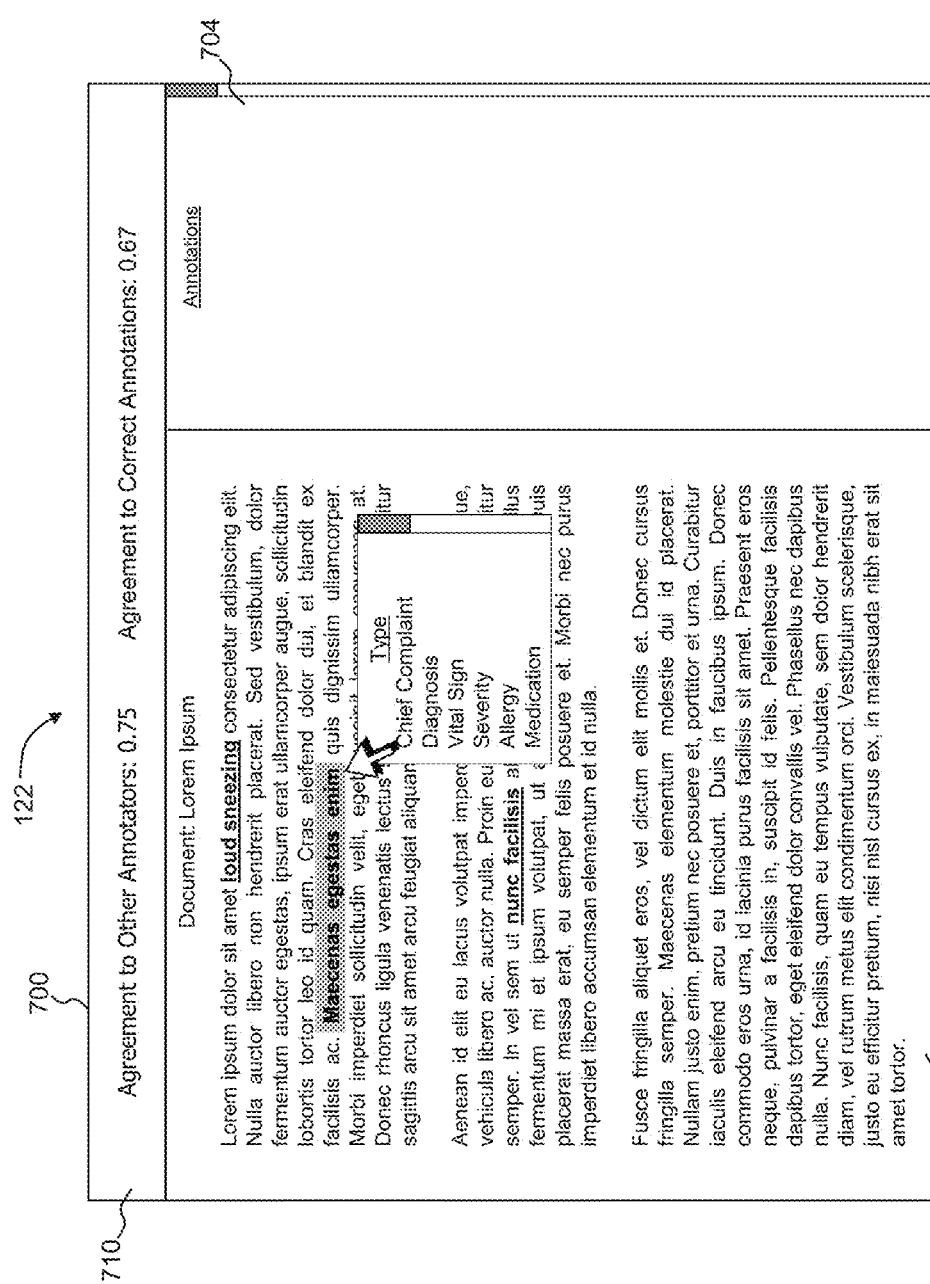
FIGS. 7A and 7B illustrate a graphical user interface for annotator training, in accordance with an embodiment of the present invention.
Figure 7B:
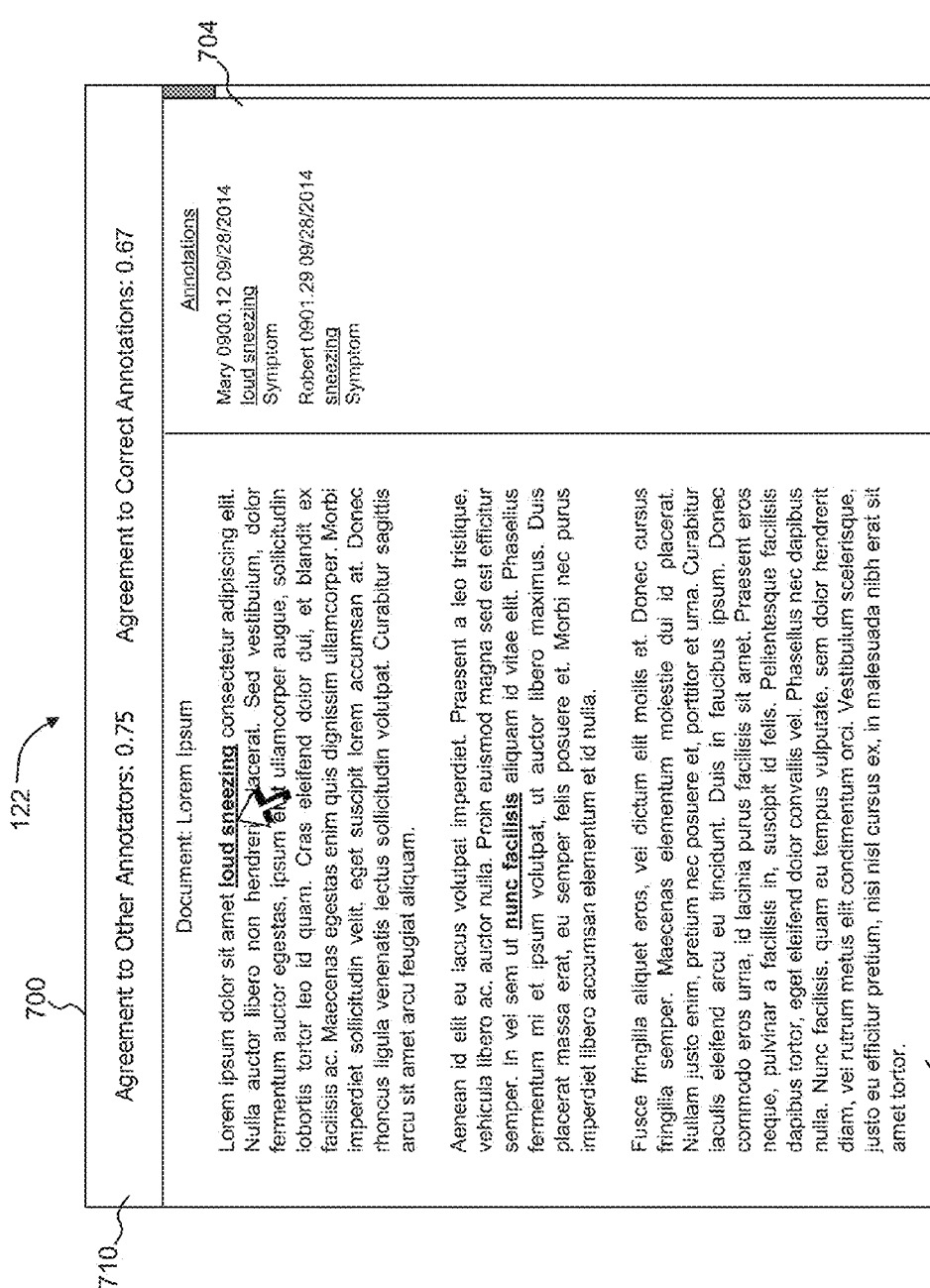

FIGS. 7A and 7B illustrate a GUI 122, in accordance with an embodiment of the invention that includes an annotator training capability. In an exemplary embodiment, GUI 122 is a annotation training web page 700 displayed in a web browser executing on a client computing device 120. Annotation training web page 700 is similar in many aspects to collaborative annotation web page 500, described above. Annotation training web page 700 includes a document pane 702, an annotations pane 704, and an inter-rater agreement statistics pane 710. HTML code and embedded Java scripts may control how information is presented on the web page, and control interactions of the annotator with this information.

Document pane 700 contains the training document 116 that is being used to train the annotator. In one embodiment, the training document 116 includes metadata, or associated files, that may be used to produce an unannotated version of the training document, and that also includes annotation history, for example, the information recorded to annotation datastore 306, described above, when the document was originally annotated.

FIG. 7A illustrates an embodiment of how a phrase may be annotated. As shown, the phrase "Maecenas egestas enim," located within the text displayed in document pane 702, has been selected, for example, by left-clicking a mouse or other pointing device and highlighting the desired span of text by dragging a "select" mouse pointer over the desired phrase. In FIG. 7A, the selected text is indicated as shaded. The annotator may then right-click the mouse to display a context drop-down menu that displays selectable "type" entries. When the annotator selects a type, this information may then be transmitted to collaborative session manager 200, where it may be stored by annotation tracking module 304 in annotation datastore 306.

FIG. 7B illustrates an embodiment of how annotation information from previous annotators may be displayed. As shown, the phrase "loud sneezing," located within the text displayed in document pane 702, is bolded and underlined, indicating that the phrase has been annotated by the annotator in training. In certain embodiments, the annotator in training may have access to how previous annotators annotated a phrase. For example, locating the mouse cursor over a phrase that has been annotated by the annotator in training may result in a display in annotations pane 704 of information that may include how previous annotators have annotated the phrase.

Inter-rater agreement statistics pane 710 includes statistics generated by inter-rater statistics module 310. In the illustrated embodiment inter-rater agreement statistics pane 710 includes the level of agreement between the annotator in training and the original annotators of the source document, and the level of agreement between the annotator in training and the correct annotations in the training document 116.

Figure 8:
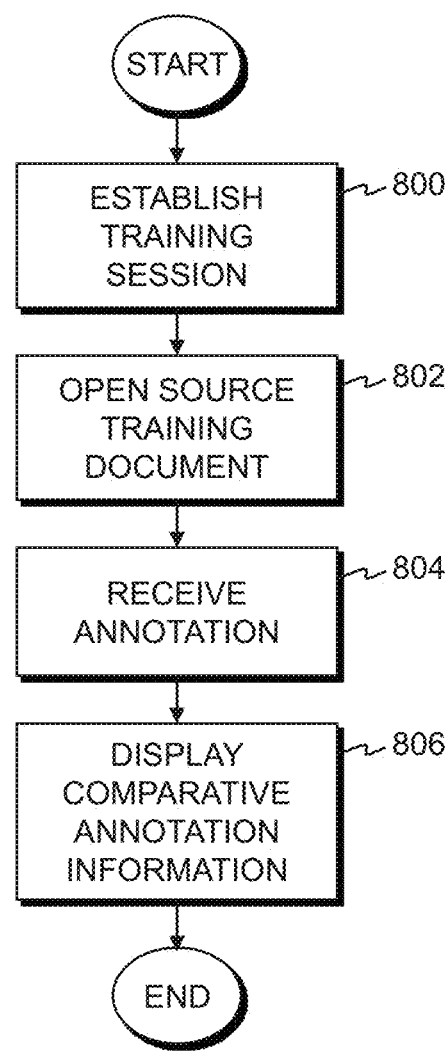
FIG. 8 is a flowchart depicting operational steps of the annotation training module of FIG. 2, in accordance with an embodiment of the present invention.

FIG. 8 is a flowchart depicting operational steps of annotation training module 202 of FIG. 2, in accordance with an embodiment of the present invention. When collaborative annotation program 112 receives a request to establish an annotation training session, for example, by receiving the request as the result of an annotator entering the URL of collaborative annotation program 112 on network server 110 into a web browser residing on a client computing device 120, collaborative annotation program 112 establishes an annotation training session (step 800). In establishing the annotation training session, annotation training module 202 may respond to the request by transmitting a web page to the browser on the requesting client computing device 120 that requests the name of the training document that will be annotated.

When the name of the training document that will be annotated is received by annotation training module 202, the document may be retrieved from training documents 116 and loaded into working document store 312 (step 802). The training document 116 may include embedded metadata that, for example, numbers each word, and may include metadata and/or associated files that include the original source document annotations, including the "correct" annotations. GUI manager 300 may be called by annotation training module 202 to generate and transmit an annotation training web page to the requesting client computing device 120. The training document, its metadata, and associated files may be embedded into, or transmitted with, the annotator training web page, such as a web page as illustrated in FIGS. 7A and 7B, to the requesting client computing device 120 for display in, for example, a web browser or other GUI 122. The annotator training web page may also include Java scripts that enable an annotator to annotate the document and interact with annotation training module 202.

GUI manager 300, operating in single user mode, may receive and track annotations received from client computing device 120, via, for example, a GUI 122 (step 804). Annotation tracking module 304 tracks the received annotations in annotation datastore 306, and updates the source document in working document datastore 312. GUI manager 300 may then update the annotation training web page 700 with the changes to working document datastore 312 and transmit a new version of the web page to the client computing device 120.

As the annotator in training submits annotations, conflicts between these annotations and the correct annotations may be identified by annotation conflict module 308, for example, as described above (step 806). Annotations submitted by the annotator in training that conflict with the correct annotation may, for example, be highlighted on the annotation training web page 700 as the annotation is submitted, upon request of the annotator in training, or periodically during the training session. Upon, for example, positioning the mouse cursor over the highlighted annotation, information concerning the conflict may be displayed to the annotator in training. In various embodiments, this information may include the correct annotation and/or annotations received when the training document was originally annotated. Inter-rater agreement statistics between the annotator in training and the correct annotations and/or annotations received when the training document was originally annotated may be displayed to the annotator in training to provide a qualitative assessment of the accuracy of the annotations of the annotator in training.

Alternative Embodiments

A particular embodiment of the invention has been described in detail above. However, those of skill in the art will recognize that the invention can be implemented in other embodiments without undue experimentation.

In one alternative embodiment, an annotation may take the form of a question and answer pair. For example, questions may be posed, such as "Who was the first American in space?" A variety of answers may be received, for example, "Shepard," "Alan Shepard," "Alan Bartlet Shepard," "John Glenn," and "Chuck Yeager." As above, a GUI may be presented to each participant that allows for, for example, entry of annotations, multi-modal communication between annotators, display of inter-annotator agreement statistics, and display of annotations from other annotators. A "correct" annotation may be identified, or, as the example answers may suggest, more than one annotation may be correct, or certain annotations may be flagged as more correct. All received annotations, and their degree or rank of "correctness," may be stored for later use to train human annotators, to produce training guidelines, and by NLP based systems as training data.

In another alternative embodiment, a question presented to an annotator may require a selection of multiple answers. For example, an annotator may be presented with the question "What finding is caused by Malaria?" and the answer choices "fever," "sweats," "chills," "nausea," and "vomiting." In various degrees stages of the disease, some or all of the findings may be present in a patient with Malaria. In this example, any combination of the answer choices may be considered as correct, however, certain combinations may be considered as more correct, or have an associated higher rank. Again, as above, a GUI may be presented to each participant that allows for, for example, entry of annotations, multi-modal communication between annotators, display of inter-annotator agreement statistics, and display of annotations from other annotators.

FIG. 9 depicts a block diagram of components of a client computing device 120 and/or a server 110 of FIG. 1, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

Client computing devices 120 and/or a server 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, collaborative annotation program 112 and/or GUI 122, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computing devices 120 and/or a server 110 may also include a R/W drive or interface 914 to read from and write to one or more portable computer readable storage media 926. Application programs 928 on client computing devices 120 and/or a server 110 may be stored on one or more of the portable computer readable storage media 926, read via the respective R/W drive or interface 914 and loaded into the respective computer readable storage media 908.

Client computing devices 120 and/or a server 110 may also include a network adapter or interface 916, such as a TCP/IP adapter card or wireless communication adapter (such as a 4G wireless communication adapter using OFDMA technology). Application programs 928 on computing devices 120 and/or a server 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Client computing devices 120 and/or a server 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed in accordance with the present invention. However, numerous modifications and substitutions can be made without deviating from the scope of the present invention. Therefore, the present invention has been disclosed by way of example and not limitation.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A method for collaborative annotation of a document, the method comprising:
   generating, by a host computer, a graphical user interface (GUI) that displays a document to annotate;
   transmitting, by the host computer to a plurality of client computers, the GUI;
   establishing, by the host computer, a plurality of real time communication modes between the client computers, each communication mode including communication channels between all client computers;
   receiving, by the host computer from of the plurality of client computers, a plurality of correct annotations and incorrect annotations entered into the GUIs at the client computers, each correct annotation and incorrect annotation identifying a span of words in the document to annotate and including an associated annotation type, the correct annotations and incorrect annotations identified by a coordinator;
   identifying, by the host computer, conflicts between the received correct annotations and incorrect annotations, wherein a conflict is an associated type of one of the annotations does not match the associated type of another annotation or the span of words is associated with fewer annotations than the number of the plurality of the client computers;
   generating, by the host computer, a summary by type including each correct and incorrect annotation;
   updating, by the host computer, in real time, the GUI to include for display the received plurality of correct and incorrect annotations and inter-rater agreement statistics indicating the level of agreement between the correct and incorrect annotations received from each client computer and further including for display the identified conflicts between the received correct and incorrect annotations; and
   transmitting, by the host computer to the plurality of client computers, the updated GUI.

2. The method in accordance with claim 1, further comprising:
   receiving, by the host computer from one of the plurality of client computers, an indication that all correct annotations have been received; and
   writing to a datastore in a desired document format or formats, a correctly annotated document, including at least all the correct annotations to the span of words.

3. The method in accordance with claim 2, further comprising:
   storing, by the host computer, all communications occurring over the plurality of real time communication modes between the client computers;
   in response to receiving, by the host computer, a request to generate a timing mark, storing an association of an annotation and a timestamp of the real time communications;
   writing to a datastore a guideline outline that includes each correct annotation and incorrect annotation to the span of words or links to any associated real time discussions that may have occurred over the multimodal communication interfaces; and
   wherein writing to a datastore the annotated document further includes writing the associations of the annotations and timestamps of the real time communications.

4. The method in accordance with claim 1, wherein the GUI is a web page that includes embedded scripts to receive annotations of the document to annotate from a user of a client computer and transmit the annotations to the host computer.

5. A computer program product for collaborative annotation of a document, the computer program product comprising:
   one or more non-transitory computer-readable storage media and program instructions stored on the one or more non-transitory computer-readable media, the program instructions comprising:

program instructions to generate, by a host computer, a graphical user interface (GUI) that displays a document to annotate;

program instructions to transmit, by the host computer to a plurality of client computers, the GUI;

program instructions to establish, by the host computer, a plurality of real time communication modes between the client computers, each communication mode including communication channels between all client computers;

program instructions to receive, by the host computer from of the plurality of client computers, a plurality of correct annotations and incorrect annotations entered into the GUIs at the client computers, each correct annotation and incorrect annotation identifying a span of words in the document to annotate and including an associated annotation type, the correct annotations and incorrect annotations identified by a coordinator;

program instructions to identify, by the host computer, conflicts between the received correct annotations and incorrect annotations, wherein a conflict is an associated type of one of the annotations does not match the associated type of another annotation or the span of words is associated with fewer annotations than the number of the plurality of the client computers;

program instructions to generate, by the host computer, a summary by type including each correct and incorrect annotation;

program instructions to update, by the host computer, in real time, the GUI to include for display the received plurality of correct and incorrect annotations and inter-rater agreement statistics indicating the level of agreement between the correct and incorrect annotations received from each client computer and further including for display the identified conflicts between the received correct and incorrect annotations; and program instructions to transmit, by the host computer to the plurality of client computers, the updated GUI.

6. The computer program product in accordance with claim 5, further comprising:

program instructions to receive, by the host computer from one of the plurality of client computers, an indication that all correct annotations have been received; and program instructions to write to a datastore in a desired document format or formats, a correctly annotated document, including at least all the correct annotations to the span of words.

7. The computer program product in accordance with claim 6, further comprising:

program instructions to store, by the host computer, all communications occurring over the plurality of real time communication modes between the client computers;

program instructions, in response to receiving, by the host computer, a request to generate a timing mark, to store an association of an annotation and a timestamp of the real time communications;

program instructions to write to a datastore a guideline outline that includes each correct annotation and incorrect annotation to the span of words or links to any associated real time discussions that may have occurred over the multimodal communication interfaces; and wherein the program instructions to write to the datastore the annotated document further includes program instructions to write the associations of the annotations and timestamps of the real time communications.

8. The computer program product in accordance with claim 5, wherein the GUI is a web page that includes embedded scripts to receive annotations of the document to annotate from a user of a client computer and transmit the annotations to the host computer.

9. A computer system for collaborative annotation of a document, the computer system comprising:

one or more computer processors, one or more computer-readable storage media, and program instructions stored on one or more off the computer-readable media for execution by at least one of the one or more processors, the program instructions comprising:

program instructions to generate, by a host computer, a graphical user interface (GUI) that displays a document to annotate;

program instructions to transmit, by the host computer to a plurality of client computers, the GUI;

program instructions to establish, by the host computer, a plurality of real time communication modes between the client computers, each communication mode including communication channels between all client computers;

program instructions to receive, by the host computer from of the plurality of client computers, a plurality of correct annotations and incorrect annotations entered into the GUIs at the client computers, each correct annotation and incorrect annotation identifying a span of words in the document to annotate and including an associated annotation type, the correct annotations and incorrect annotations identified by a coordinator;

program instructions to identify, by the host computer, conflicts between the received correct annotations and incorrect annotations, wherein a conflict is an associated type of one of the annotations does not match the associated type of another annotation or the span of words is associated with fewer annotations than the number of the plurality of the client computers;

program instructions to generate, by the host computer, a summary by type including each correct and incorrect annotation;

program instructions to update, by the host computer, in real time, the GUI to include for display the received plurality of correct and incorrect annotations and inter-rater agreement statistics indicating the level of agreement between the correct and incorrect annotations received from each client computer and further including for display the identified conflicts between the received correct and incorrect annotations; and program instructions to transmit, by the host computer to the plurality of client computers, the updated GUI.

10. The computer system in accordance with claim 9, further comprising:

program instructions to receive, by the host computer from one of the plurality of client computers, an indication that all correct annotations have been received; and program instructions to write to a datastore in a desired document format or formats, a correctly annotated document, including at least all the correct annotations to the span of words.

11. The computer system in accordance with claim 10, further comprising:

program instructions to store, by the host computer, all communications occurring over the plurality of real time communication modes between the client computers;

program instructions, in response to receiving, by the host computer, a request to generate a timing mark, to store an association of an annotation and a timestamp of the real time communications;

program instructions to write to a datastore a guideline outline that includes each correct annotation and incorrect annotation to the span of words or links to any associated real time discussions that may have occurred over the multimodal communication interfaces; and wherein the program instructions to write to the datastore the annotated document further includes program instructions to write the associations of the annotations and timestamps of the real time communications.

12. The computer system in accordance with claim 9, wherein the GUI is a web page that includes embedded scripts to receive annotations of the document to annotate from a user of a client computer and transmit the annotations to the host computer.

\* \* \* \* \*